350-272

CROSS REFERENCE

SEARCH ROOM 178
7.6

FACSIMILE SCANNING MEANS

Original Filed March 30, 1954

INVENTOR.

GEORGE M. STAMPS

BY Tyler S. Boundy

ATTORNEY

FACSIMILE SCANNING MEANS

Original Filed March 30, 1954 2 Sheets-Sheet 2

INVENTOR.

GEORGE M. STAMPS

BY Tyler S. Roundy

ATTORNEY 3,011,020

FACSIMILE SCANNING MEANS

George M. Stamps, New Hyde Park, N.Y., assignor, by mesne assignments, to Hogan Faximile Corporation, a corporation of Delaware Original application Mar. 30, 1954, Ser. No. 419,747. Divided and this application July 22, 1959, Ser. No. 828,795

6 Claims. (Cl. 178—7.6)

This invention relates to the art of facsimile scanners. The invention concerns apparatus and scanning element means therein for scanning graphic copy and concerns particularly means for scanning continuously to produce corresponding electrical signals for transmission to a suitable graphic copy recorder.

This application is a division of my copending application Ser. No. 419,747, filed March 30, 1954, now abandoned, which in turn is a continuation-in-part of my copending application Ser. No. 291,144, filed June 2, 1952, now Patent No. 2,967,907, issued Jan. 10, 1961.

It is an object of the invention to provide compact relatively simple and inexpensive means for scanning graphic copy and particularly continuous-feed graphic copy.

It is another object to provide an improved scanning means assembly. It is another object to provide in a continuous-feed graphic copy scanner at least one flat disk having a spiral scanning aperture.

It is another object to provide flat spiral scanning elements for a continuous-feed graphic copy scanner having a folded optical path.

It is another object to provide a scanning member including a spiral window and spiral groove adapted to combine the functions of a scanning element and lens system.

Additional objects and advantages of the invention will become apparent from the following description.

Heretofore the typical scanner used in facsimile transmission has been of what may be called the "lathe" type. In such scanners the subject copy, whose graphic content is generally to be delivered electrically to a distant recording point, is wrapped around and somehow fastened to the surface of a cylindrical drum. The copy-carrying drum is then rotated and, by means of a track and lead-screw, a photoelectric "tool" is moved axially along the rotating cylinder so as to trace a helical path over the whole copy surface. Successive turns of the helix so traced constitute the successive scanned lines of the image to be transmitted. The mechanical operation is analogous to that of a screw-cutting lathe, and the design problems and limitations are quite similar. Thus, the lathe-type facsimile scanner is usually large, heavy, expensive, and inflexible as to its optical system. Moreover, it has the inherent operating disadvantages that:

(*a*) After each transmission the old subject copy must be removed from the drum and new copy wrapped around and fastened to it; and (*b*) The subject material must be in the form of thin flexible single sheets of limited length. Thus the pages of a bound book or magazine cannot be handled unless the binding is destroyed, and sheets of extended length must be cut or folded and handled in sections.

There have been a number of attempts made to devise facsimile scanners that would be free from some or all of the disadvantages above enumerated. In one such scanner a bright spot of light is developed upon the screen of a cathode-ray tube and swept in a straight line across the screen and projected upon the subject copy to provide fast or side-to-side scanning. Slow, or end-to-end, scanning is obtained by progressively moving the copy. In this electronic type of scanner, difficulties arise from the inherent lack of linearity of line sweep and non-uniformity of scanning spot brightness and the maximum definition obtainable is low compared with that obtainable by mechanical scanning as disclosed herein. In another known type of continuous scanner, a moving light spot is produced by illuminating the intersection between a stationary linear slit and a rotatable helical slit, both slits being formed in opaque members. This type of scanner is limited to use with transparent copy and has other implicit limitations.

The present invention is intended to avoid or overcome the limitations and difficulties of prior facsimile scanners. The invention is adapted for use in facsimile broadcasting as well as for short-distance wire transmission and long-distance microwave transmission. Scanning disks in accordance with the invention include continuous flat spiral apertures or windows of types disclosed in the aforesaid Patent No. 2,967,907. The invention in one aspect contemplates a double disk scanning arrangement which gives a higher definition than can be had from a comparable single-spiral arrangement.

The line of graphic copy being scanned by the present scanning arrangement must be brightly and uniformly illuminated. Illumination is provided by two tubular fluorescent lamps. The scanned line of the copy is viewed between the lamps. Both lamps are operated on direct current or high frequency alternating current to prevent flicker. When direct current is used the polarities of the two lamps are reversed so that the cathode phenomena occur at opposite ends. With the lamps properly positioned, the copy is brightly illuminated because the phosphor surfaces of the lamps are physically near, and specular reflection is avoided. The illumination of a given copy element comes from at least an inch of each lamp surface so that lamp irregularities and striations are averaged out.

In order to conserve space, the optical path is folded by a front surface mirror. An enlarging objective lens converges the light through a coarse scanning disk to a focus in the plane of a fine scanning spiral disk. An element including a straight linear horizontal aperture or window is located between the two disks, with the straight aperture and fine scanning spiral window within 0.01 inch of each other. The apertured light is collected by a stationary image of the straight window on the photo-cathode surface of a photomultiplier tube, so that, although the spiral-linear aperture sweeps across the image field, the light spot formed on the phototube does not move. A cylindrical lens is also used in the system to squeeze the light image on the photo-cathode from a circle to a generally elliptical form to conform to the cathode shape.

Power to drive the scanner is furnished by a synchronous motor. Two sets of toothed rubber timing belts drive the disk shafts. The disk shafts are concentric, the inner shaft driving the fine scanning disk at motor speed and an outer sleeve shaft driving the coarse scanning disk via a speed reduction pulley. A small separate motor drives a copy feed roller at a speed which has a predetermined relationship to that of the scanner motor.

There may be some loss of signal response near the ends of the scanning line sweep due primarily to the cosine fourth law of illumination characteristic of all objective lenses. In addition, some fall-off in signal response may result from the oblique angle of incidence at the photo-cathode for light arriving from the ends of the sweep, and from the reduced efficiency of the condenser lenses at wide angles. The total loss from all of these causes may be approximately thirty percent near the ends of the sweep. In order to correct for this light loss a mask is used having a light compensating aperture and located between the copy and the objective lens.

The continuous copy scanner thus briefly described overcomes the main objections to prior scanners. It is small, light, less expensive and relatively simple as to its optical system. There is no need to stop transmission for loading and unloading of drums, because copy can be fed into the scanner continuously. Inflexible or bound copy can be scanned by employing a moving frame mount for the copy. Because flood illumination of the scanned copy rather than the spot-type is employed, the requirements for shielding from ambient light are not critical.

In a modified form of the invention the optical system is simplified by replacing the fine scanning disk and condensing lenses with a flat disk including a spiral aperture and a groove having one side varying continuously in inclination with respect to the flat surface of the disk. The spiral groove has optical focusing properties. The disk serves as a deflector-collector element for light reflected from the scanned copy.

The invention will be best understood from the following description taken together with the drawings by way of example, wherein.

Figure 1:
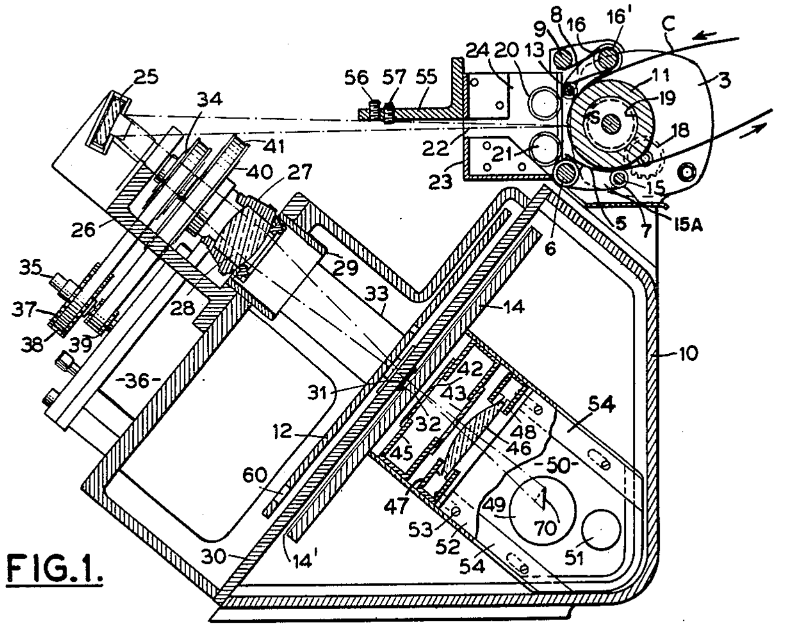
FIGS. 1 and 2 are sectional and rear views respectively of an apparatus embodying the invention.
Figure 2:
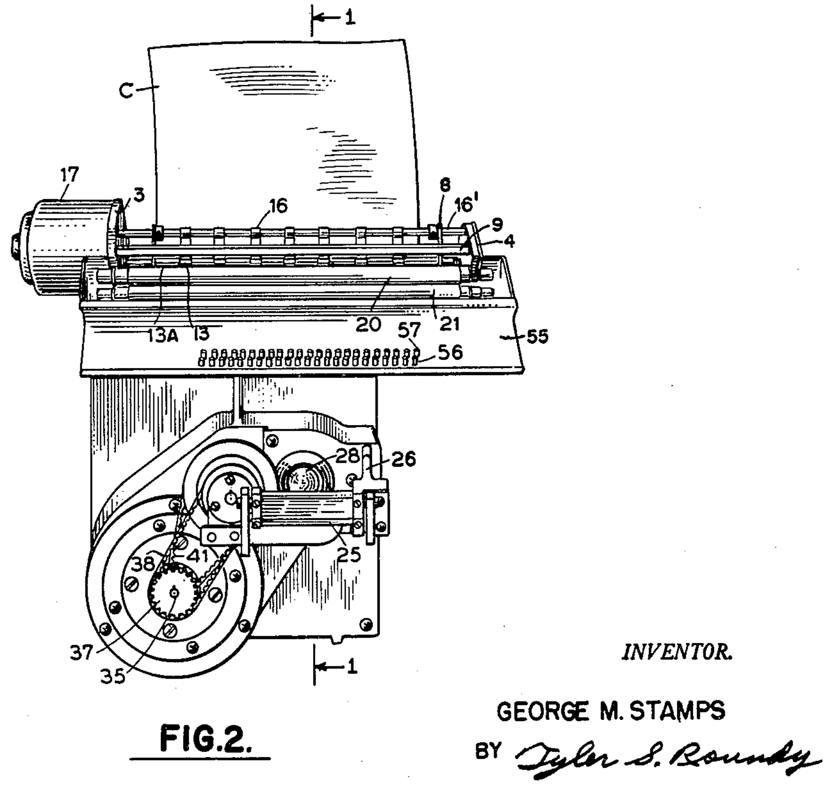

In FIGS. 1 and 2 there is shown a preferred embodiment of the invention. A generally rectangular frame 10 serves as a support for copy roller 11, the scanning disks 12 and 14, and associated optical system. Copy C is fed continuously around roller 11 near one corner of frame 10. Pressure rollers 13, 15 maintain proper tension in the copy as it passes scanned line S. Rollers 13 and 15 carry rubber sleeves 13A and 15A respectively which press against the roller 11. Roller 13 is supported by arms 8 from stationary shaft 16'. Roller 15 is supported by arms 7 from stationary shaft 6.

The U-shaped springs 16 are provided to keep copy C smooth and straight. Springs 16 are carried by stationary shaft 16'. One leg of each spring terminates under shaft 9 and the other leg rests on roller 11. Certain ones of springs 16 have one leg terminating under shaft 9 and the other leg pressing on shaft 13 between the sleeves 13A.

A scoop plate 5 is supported by shaft 6 and serves to guide the paper C between rollers 11 and 7. Shafts 6, 9, 16' are supported in the end frame plates 3, 4. Plate 3 supports motor 17. Roller 11 is driven by motor 17 at a predetermined speed via a gear train 18, 19. A pair of tubular fluorescent lamps 20, 21 are disposed parallel to the scanned portion of the copy and flood light the entire scanned line S. A slot 22 is provided in the end wall 23 of the lamp housing 24. Light is reflected from the scanned line through slot 22 to the mirror 25. Mirror 25 is supported near one corner of frame 10 in the ends of a frame member 26, attached to the frame 10.

Frame member 26 supports the lens assembly 27 which carries the objective lens 28. A lens barrel 29 is provided for the lens assembly 27 and is threaded in the frame member 26. The lens is focused by adjusting the position of the lens barrel in the frame member 26. The frame 10 is provided with a wall 30 in which is a wide slot. Over this slot is disposed a strip of opaque film 31 in which is a transparent straight aperture or window 59 as will be described in connection with FIGS. 3 and 4.

Scanning disks 12 and 14 are disposed for rotation at the sides of wall 30. The fine scanning disk 14 rotates on shaft 32 and coarse scanning disk 12 rotates on a cylindrical or sleeve shaft 33. Shaft 32 is axially aligned with and rotates within shaft 33. Gear 34 is carried by shaft 32. Shaft 35 of synchronous motor 36 carries the large gear 37 and small gear 39. Disk 14 rotates at the same rate as gears 34 and 37 and the shaft 35 of the synchronous motor 36. The gear 37 is operatively connected to gear 34 via a toothed rubber belt 38. The smaller gear 39 also carried by shaft 35 is operatively connected to a speed reduction gear 40 via toothed rubber belt 41. Gear 40 is carried on shaft 33 and causes rotation of disk 12 at a rate equal to $$\frac{1}{N}$$

times the rate of rotation of disk 14, where N equals the number of turns of the spiral aperture or window 58 in the film 14' carried by disk 14.

A pair of flat spirally grooved condensing lenses 42, 43 is disposed in the optical housing 44 and carried on the sides of frame 45. A cylindrical condensing lens 46 is mounted in frame members 47, 48 and is disposed in the optical path of the lenses 42, 43. A photomultiplier tube 49 is disposed near one corner of frame 10 in a compartment 50 of the optical housing together with a cathode follower tube 51. The tubes 49, 51 are carried by a plate 52 secured by screws 53 to the flanges 54. The cover plate is shown partly cut away to expose the interior of the tube compartment. In an alternative arrangement, the cathode follower 51 can be disposed outside of compartment 50 and attached to a wall thereof or to the frame 10. In any case, the tubes 49 and 51 may be connected electrically as disclosed in said application Ser. No. 419,747, now abandoned.

Instead of arranging shafts 32, 33 coaxially they may be disposed parallel to each other but spaced apart so that the disks 12 and 14 overlap only partially. Included in the area of overlap will be the straight window 59. In this modification strip 31, shaft 32 and disk 14 will remain in the positions shown in FIGS. 1 and 2 with shaft 32 driven by belt 38. Gears 39, 40 and belt 41 will be omitted. Disk 12 on shaft 33 will be provided with gear teeth which will mesh with a matching gear to be carried by shaft 32. The gear ratio will be such that disk 12 rotates at a speed equal to $$\frac{1}{N}$$

times the speed of disk 14, where N is the number of turns of spiral window 58. Slot 60 and spiral window 58 overlap in the area including straight window 59. In this arrangement, the several parts of the apparatus are not as compactly disposed as shown in FIG. 2, but the optical system and mode of operation are substantially unchanged.

In order to compensate for variation in signal response due to light losses along the line of scanning sweep and across the optical path, a light compensating device or mask is provided between copy C and objective lens 28. The device includes an L-shaped plate 55 secured to lamp housing wall 23. At least two rows of cylindrical elements such as flat-end set screws 56, 57 are disposed in overlapping relationship to form a continuum when viewed from the objective lens. When a screw is extended below the plate 55 is penetrates into the optical path, and when fully extended completely blocks light passing through slot 22 at the location of the screw. Another plate 55 provided with screws 56, 57 may be attached to lamp housing wall 23 below slot 22, with the screws arranged to project upwardly into the optical path. The two cooperating plates 55 would thus serve as an adjustable mask for controlling the cross sectional configuration of the optical path from below and above slot 22. Instead of screws, slidable pins held frictionally in overlapping apertures in the plate 55 may be used.

When a screw or pin is extended into the optical path it causes a reduction in response for the section of the copy which lies in its penumbra. By observing the response of the scanner to white copy (on an oscilloscope) and by adjusting the screw or pins 56, 57 it is possible to adjust the response across the scanning line to the linearity desired. Since the screws do not lie in a focal plane the effect of any single screw is a smoothly varying function, and since the response losses are also smoothly varying, the control afforded by the screws is adequate to produce a uniform response. Once the shape of the correcting aperture has been determined in this way, plate or plates 55 with screws 56, 57 can be replaced by a cut sheet metal mask. This light path correction is in the nature of an initial adjustment and need not be changed during normal operation of the scanner.

It may be found that the tubular lamps 20, 21 fall off somewhat in intensity of illumination at their ends so that the scanned line S is not uniformly illuminated.

The mask may be suitably shaped to compensate for this effect. Also if the lamps are made longer than the scanned line S, this effect will be minimized.

Figure 3:
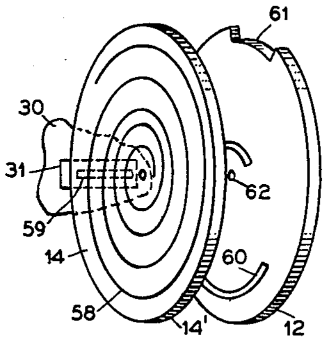
FIG. 3 is a perspective view of scanning elements in accordance with the invention as employed in the apparatus of FIGS. 1 and 2.

The fine scanning disk 14 is shown diagrammatically in FIG. 3. The disk is a transparent plate with an opaque film layer 14'. A transparent multiturn spiral aperture or window 58 is formed in the opaque film layer 14; for example by photographic means as disclosed in said application Ser. No. 419,747, now abandoned. A straight linear aperture or window 59 is formed in the film strip 31 on plate 30 disposed between the plate and disk 14, and not more than 0.01 of an inch from the spiral aperture 58 in film 14'. Opaque disk 12 has a single-turn spiral slot 60 formed therein and serves as a turn selector disk. A portion 61 of disk 12 is cut out to counterbalance the disk on its axis 62.

Figure 4:
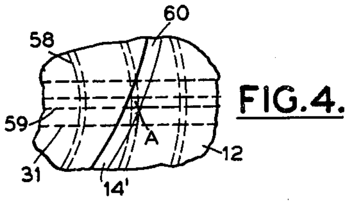

The width of linear aperture 59 limits the vertical size of the line scanning element A as shown in FIG. 4. The selection of the particular one of the N spiral turns which defines the scanning element A is determined by the single-turn spiral slot 60. The slot 60 does not determine scanning definition but only selects the particular one of the N turns of spiral aperture 58 intersecting aperture 59 which shall be effective to define the scanning element A or aperture A. The size of the scanning element A is thus limited only by the intersecting widths of the spiral 58 and straight window 59.

The mode of operation of the scanning elements will now be readily apparent. As shown in FIG. 4, the spiral aperture 58 intersects the linear aperture 59 at a plurality of points equal to the number of turns N of the spiral aperture 58. When disk 14 rotates, the intersection of the spiral and linear apertures establishes N parallelogrammic apertures or elements A which travel along aperture 59. Since disk 14 rotates at constant speed, the apertures A move along aperture 59 at constant speed. Disk 12 also rotates at constant speed but at $$\frac{1}{N}$$

times the speed of disk 14. Thus only one aperture A is selected and is swept at constant speed across the stationary line defined by the linear aperture 59.

There are at least four basic and critical requirements for the spiral aperture 58 used in the present scanning system:

First, the spiral must have the right shape. Any departure from the correct shape produces distortions in the copy. A sudden "bend" or "kink" in the spiral is disastrous to the production of undistorted facsimile transmission. Thus the slope of the spiral at all points must be accurate, as well as the position.

Second, the spiral origin must be correctly centered on the axis of rotation of the disk shaft. An error of centering will cause the velocity of the sweeping aperture to vary in such a way that the spot successively leads and lags each revolution by a distance equal to the misalignment. A few thousandths of an inch of such misalignment produces detectable distortion.

Third, the aperture must be of uniform width, and errors in uniformity must become negligible when averaged out over a length of spiral corresponding to that of a single scanning element A. In the present embodiment the width of the spiral is substantially 0.002 inch and the length of the scanning element is less than two degrees of arc so that at least 1000 elements per sweep are effectively resolved with a five-turn spiral.

Fourth, the light transmissivity of the aperture must be constant and high (i.e., it must be clear), and the region around the scanning aperture must be sensibly opaque.

A preferred method and apparatus for forming a spiral scanning element satisfying the above requirements is shown in said Patent No. 2,967,907.

Figure 5:
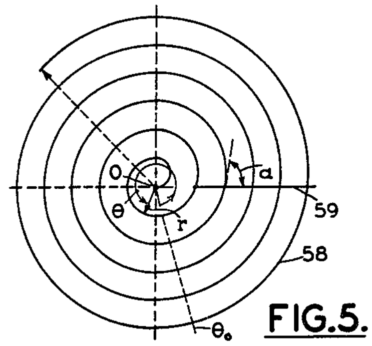

Mathematically, spiral 58 is a true Archimedes spiral as shown in FIG. 5. The Archimedes spiral has the property that $$r=K\theta$$

i.e., in polar coordinates the radius vector $r$ to any point on the curve is directly proportional to the angle turned from a radial reference line, $\theta_0$, where K is a constant. in particular, if $\theta$ changes at a constant rate, $r$ will increase at a constant rate, and $$\frac{dr}{dt}=K\frac{d\theta}{dt}$$

It follows that the aperture formed by the intersection of the Archimedes spiral and the linear aperture 59 directed through the origin O (axis of rotation) moves at a linear rate of speed when the spiral is rotated at a constant number of revolutions per minute.

The slope of the angle of intersection, $\alpha$, between spiral and linear apertures is found from the velocity ratios, $$\frac{rd\theta}{dr}=\frac{r}{K}$$

Since the intersection angle $\alpha$ changes with $r$, the shape of the parallelogrammic scanning aperture A (see FIG. 6) also changes with $r$. In order to keep $\alpha$ greater than 80 degrees for small values of $r$, K must be kept small. However, $\Delta r$, the sweep distance, must be great enough so that the width of the spiral aperture itself is not prohibitively small. Thus for high resolution systems capable of resolving from one to two thousand elements per sweep, either the spiral disk must be very large or the spiral must have more than one complete turn.

The multiturn, or fine spiral 58 shown in FIG. 3 has five turns and may rotate at 1800 r.p.m., which is a standard synchronous motor speed. Since the fine scanning disk 14 must make five revolutions to complete one sweep, the coarse scanning disk 12 must turn at one-fifth of 1800, or 360 r.p.m., which is the actual scanning rate.

In addition to permitting the use of smaller scanning disks, the multiturn spiral has two other advantages. It virtually eliminates scanning "jitter," and it leads to an integrating effect which smooths out any defects of the spiral which may be present. This will be explained with reference to FIGS. 6 and 7.

In conventional lathe-type scanners one revolution of the drum corresponds to one scanning sweep. The percentage of jitter present in the facsimile signal is the percentage departure of the drum per revolution from an exactly repetitive motion. In a five-turn spiral scanner as disclosed herein the percentage of jitter present in the transmitted signal is the percentage departure of the disk per five revolutions from an exactly repetitive motion. In other words, for the same rotational irregularity, this spiral scanner has one-fifth the jitter of the equivalent drum scanner. Further, since the fine scanning disk turns at the same speed as that of motor 36, no reduction gearing is needed between the motor and the fine scanning disk and at 1800 r.p.m. a large fraction of the system loading is only smooth wind friction.

Figure 6:
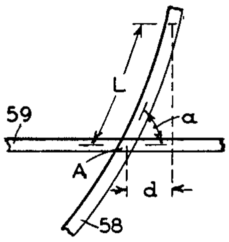
FIGS. 4, 5, 6, 7 are diagrams illustrating certain characteristics of the scanning elements.
Figure 7:
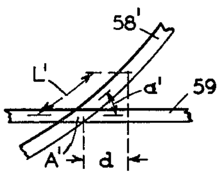

In FIGS. 6 and 7 are shown the parallelogrammic apertures A and A'. Aperture A is defined by one turn of a multiturn spiral 58 (having N turns) intersecting linear aperture 59, while aperture A' may be defined by a single-turn spiral 58' intersecting a linear aperture 59. As indicated in FIGS. 6 and 7, for the same elemental sweep length $d$, the length L of aperture 58 which passes aperture 59 is N times greater than the length L' of aperture 58'. Thus irregularities which may exist in the width of spiral aperture 58 and other irregularities in the system which could cause scanning jitter are averaged over N times as great a length in producing the parallelogrammic aperture A as in producing aperture A'. In general, irregularities in spiral width just detectable in an apparatus employing a one-turn spiral window could be almost N times as prominent before being detectable when an N-turn spiral aperture 58 is used. Furthermore, the N-turn spiral aperture 58 intersects linear aperture 59 at an angle $\alpha$ which is steeper than angle $\alpha'$. At positions close to the central axis of disk 14 the area of parallelogram A is increased due to the smaller intersection angle of the spiral and straight apertures. For whatever limit is placed on the maximum area of scanning aperture A, the N-turn spiral aperture produces its limiting area of parallelogram A closer to the center of disk 14 than a one-turn spiral 58' of corresponding sweep distance. Thus a disk with an N-turn spiral aperture may have a smaller radius than a disk with a one-turn spiral aperture which sweeps across aperture 59. A contribution to improved scanning definition is further provided by use of an N-turn spiral aperture in that the steep turns of the spiral produce a parallelogrammic aperture A which more nearly approaches the ideal of a true rectangle than the stretched and flattened parallelogram A' produced by a single turn spiral 58'.

In operation of the apparatus shown in FIGS. 1 and 2 the copy C is advanced by the roller 11 at a predetermined rate by the speed of motor 17. Motor 17 may be a synchronous motor driven from the same power source as synchronous motor 36, or any other type of motor run at a predetermined speed with respect to that of motor 36. Lamps 20 and 21 illuminate the scanned line S with substantial uniformity along the line. The reflected light beam is directed to mirror 25 and reflected through objective lens 28. The lens 28 is focused on the plane of spiral window 58 or linear window 59 so that the scanned line S is centered on the linear window. As the fine scanning spiral window 58 is rotated via pulleys or gears 34, 37 and belt 38, the coarse scanning spiral window 60 is rotated via pulleys 39, 40 and belt 41 in coordination with spiral window 58 at $$\frac{1}{N}$$

times the rate of speed of spiral window 58. The speed of motor 17 is fixed so that the image of copy C focused on the aperture 59 is advanced a distance equal to the vertical width of the linear aperture 59 for each rotation of the disk 12 carrying the coarse scanning spiral 60. Condensing lenses 42, 43 and 46 focus the light from the successive scanned areas A on the photo-cathode 70 of the photomultiplier tube 49 to produce corresponding electrical impulses. In order to insure that the light projected on the photo-cathode is uniform throughout the length of the scanning line for white copy, the mask including screws 56, 57 may be adjusted in the optical path between copy C and the phototube until an oscilloscope connected to the output of the cathode follower tube 51 shows that uniformity of scanning has been attained.

Figure 8:
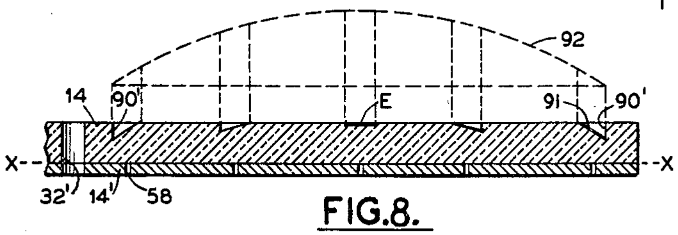
FIGS. 9 and 8 are plan and sectional views respectively of a modified scanning element.
Figure 9:
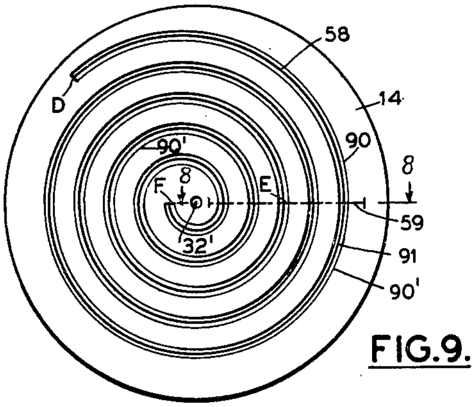

In FIGS. 8 and 9 is shown a modification of the invention which makes possible omission of condensing lenses 42, 43, 46 in the apparatus of FIG. 1. The transparent disk 14 has mounted on one side the film layer 14' including the multiturn spiral window 58. Aperture 32' is provided to receive the shaft 32 shown in FIG. 1. On the other side of the disk 14 is a spiral groove 90 located so that spiral 58 is located between the lateral boundaries of the groove. Groove 90 is rather V-shaped in cross section. It has a substantially flat bottom or side 91 which is inclined to the plane $x$—$x$ of the faces of the disk 14 and the spiral 58, and a vertical or steep side 90'. The angle of inclination of the bottom of the groove varies continuously from the inner end F to the outer end D of the groove. It will be noted that the groove bottom 91 is inclined at all points to duplicate in composite the curvature of a theoretical lens 92. Thus the inclination of the groove bottom is steepest at points D and F but inclined in opposite manner, while at point E, the midpoint of the groove taken along its length, the groove bottom is substantially parallel to plane $x$—$x$ and almost coincident with the face of disk 14. The particular advantage of this modification of the invention is that disk 14 with groove 90 constitutes a light directing optical element for the moving scanning aperture A produced by intersection of apertures 58, 59 and selected by slot 60, as the disk 14 is rotated, to project aperture A on the photo-cathode 70 for all positions of the spiral aperture 58. The disk 14 thus serves the double purpose of carrying the spiral scanning aperture 58 and serving as a light collector and director. By this construction of disk 14 it is possible to eliminate one or all of the lenses 42, 43, 46 since as above mentioned the groove 90 can be arranged to focus the scanning aperture A directly on the photo-cathode 70 of the photomultiplier tube. If desired the composite inclination of the bottom of the groove can be made equivalent to that of an elliptical lens 92 so that spherical aberration effects are avoided.

Figure 10:
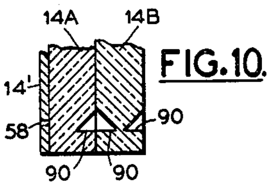
FIG. 10 is a fragmentary sectional view of a further modified scanning element.

In certain cases it may be desired to form disk 14 as an equivalent doublet. In this case the disk will have two laminations or layers 14A and 14B as shown in FIG. 10. Layer 14A will have the same type of groove 90 as shown in FIGS. 9 and 10. The layer 14B will have similar groove 90 in alignment or registration with groove 90 in layer 14A. In addition the outer or free face of layer 14B may also have a similar groove 90. With the arrangement of FIG. 10 in which film 14' carrying spiral window 58 is secured to disk layer 14A, the condensing lenses 42, 43, 46 shown in FIG. 1 may all be omitted.

In FIGS. 8, 9 and 10 film layer 14' is shown attached to the ungrooved side of the disk. The film layer 14' can, if desired, be mounted on the grooved side of the disk with the spiral 58 and groove 90 in the same relative position as shown in the FIG. 9. The arrangement of FIGS. 8 and 9 is particularly advantageous in constructing a compact simplified scanner. If the disk is made of a transparent plastic material such as an acrylic monomer the groove 90 can be formed readily by compression molding or die casting. In an alternative construction, the disk 14 can be coated with a thin opaque film layer of lacquer or the like and the spiral 58 as well as groove 90 can be formed simultaneously by a stylus with a flat cutting surface which will form the groove bottom 91, while the angle if inclination of the stylus to the disk is continuously varied from end to end of the spiral groove. If the stylus is also oscillated up and down to form a spiral of dots, a spiral of dots will be formed which will generate a carrier signal so that the spiral acts as a "light chopper." If the proper wave form is fed to the cutting stylus a pattern can be made which in the apparatus of FIG. 1 will cause the phototube to produce a sine wave signal at its output. When used in this way the disk 14 combines in one member the functions of a scanning element, light director, and light chopper. Instead of oscillating the stylus, a light chopper can be produced by modulating sinusoidally or intermittently the light emitted by a lamp as the spiral is generated on its plate.

Although the invention has been described with reference to a fine scanning element having a five-turn spiral, it will be apparent that a multiturn spiral having a greater or lesser number of turns may be used. Other modifications may be made without departing from the spirit and scope of the invention as defined by the following claims.

I claim:

1. In a facsimile scanner apparatus of the type providing a line-by-line scan and including a rotatable flat disk having at least an opaque surface and having at least one light-transmitting spiral thereon, the disk cooperating with an opaque member having a straight light-transmitting slit thereon, the improvement wherein the spiral has a light-collecting groove positioned along the length thereof, the groove having a substantially flat side inclined to the plane of the disk at an angle which increases progressively from a minimum at an intermediate point of the groove to a maximum adjacent its ends.

2. In a facsimile scanner apparatus of the type providing a line-by-line scan and including a rotatable flat disk having at least one opaque surface and having at least one light-transmitting spiral thereon, the disk cooperating with an opaque member having a straight light-transmitting slit thereon, the improvement wherein the spiral has a light-collecting groove positioned along the length thereof, the groove having a substantially flat side inclined to the plane of the disk at an angle which decreases progressively from a maximum angle at a point adjacent one of its ends to zero degrees intermediate its ends.

3. In a facsimile scanner apparatus of the type providing a line-by-line scan and including a rotatable flat disk having at least an opaque surface and having at least one light-transmitting spiral thereon, the disk cooperating with an opaque member having a straight light-transmitting slit thereon, the improvement wherein the spiral has a light-collecting groove positioned along the length thereof, the groove having a substantially flat side inclined to the plane of the disk at an angle which decreases progressively from a maximum angle at a point adjacent one of its ends to zero degrees intermediate its ends and then increases again progressively to a maximum adjacent its other end.

4. A facsimile scanner element comprising a flat opaque disk having a light-transmitting spiral groove, said groove having a substantially flat side inclined to the plane of the disk and increasing progressively in inclination from an intermediate point of the groove to its ends.

5. A light-deflecting and collecting facsimile scanner element comprising a flat transparent disk having an opaque layer thereon with a continuous spiral aperture in said layer, said disk having a spiral groove substantially centrally aligned with said spiral aperture, said groove having a substantially flat side inclined to the plane of the spiral aperture at an angle varying continuously in inclination from end to end of the groove.

6. A light-deflecting and collecting facsimile scanner element comprising a substantially flat transparent disk including two attached transparent layers and an opaque flat layer having a continuous spiral aperture formed therein on one side of the disk, said transparent layers each having at least one continuous spiral groove with a substantially flat side inclined to the plane of the spiral aperture and varying continuously in inclination from end to end of the groove.

References Cited in the file of this patent

FOREIGN PATENTS 330,505 Germany -------------- Dec. 16, 1920